United States Patent [19]

Nachfolger

[11] 4,447,266
[45] May 8, 1984

[54] CEMENTITIOUS COMPOSITION

[75] Inventor: Solomon J. Nachfolger, Monsey, N.Y.

[73] Assignee: Diamond Shamrock Chemicals Company, Dallas, Tex.

[21] Appl. No.: 415,741

[22] Filed: Sep. 7, 1982

[51] Int. Cl.³ .............................................. C04B 7/35
[52] U.S. Cl. ...................... 106/90; 106/98; 106/314
[58] Field of Search .................. 106/90, 98, 314, 315

[56] References Cited

U.S. PATENT DOCUMENTS

| | | | |
|---|---|---|---|
| 1,972,207 | 9/1934 | Tucker et al. | 106/90 |
| 1,972,208 | 9/1934 | Tucker et al. | 106/90 |
| 2,141,569 | 12/1938 | Tucker et al. | 106/90 |
| 3,277,161 | 10/1966 | Johnson | 260/505 |
| 4,026,723 | 5/1977 | Grof et al. | 106/90 |
| 4,028,125 | 6/1977 | Martin | 106/90 |

*Primary Examiner*—James Poer
*Attorney, Agent, or Firm*—Leslie G. Nunn, Jr.

[57] ABSTRACT

An effective amount of a free acid of a condensation product of naphthalenesulfonic acid and formaldehyde is added to a cementitious composition to improve its compressive strength and to reduce its water content. The free acid may be added to concrete, mortar, oil well cement slurries, grouting mixtures or the like. From about 0.05 to about 3.0% by weight is added to mortar mixtures and from about 0.1 to about 5.0% by weight is added to concrete mixtures.

10 Claims, No Drawings

CEMENTITIOUS COMPOSITION

BACKGROUND OF THE INVENTION

1. Field of the Invention

This invention relates to an improved cementitious composition.

2. Description of the Prior Art

Cementitious composition such as concrete, mortar, oil well cement slurries, grouting mixtures and the like have been the subject of extensive research.

U.S. Pat. No. 2,141,569—Tucker et al, issued Dec. 27, 1938, describes use of condensation products of certain aromatic sulfonic acids and formaldehyde in cementitious compositions as superplasticizers.

U.S. Pat. No. 3,277,162—Johnson, issued Oct. 4, 1966, describes preparation of condensation products of naphthalenesulfonic acid and formaldehyde for use in oil well cements.

SUMMARY OF THE INVENTION

An effective amount of the free acid of the condensation product of naphthalenesulfonic acid and formaldehyde is added to a cementitious composition to improve properties such as compressive strength and reduction of water content. The free acid may be added to concrete, mortar, oil well cement slurries, grouting mixtures or the like. From about 0.05 to about 3.0% by weight may be added to mortar mixtures and from about 0.1 to about 5.0% by weight may be added to concrete mixtures.

DETAILED DESCRIPTION

To develop improved cementitious compositions based on condensation products of naphthalenesulfonic acid and formaldehyde, the effect of the free acid form versus the sodium form on compressive strength was investigated. It was found that the free acid of the condensation product enhanced compressive strength of mortar and concrete mixtures significantly beyond that obtained with the sodium salt of the condensation product at the same concentrations when the anionic materials in the free acid of the condensation product of naphthalenesulfonic acid and formaldehyde have an equivalent elution volume by size exclusion chromatography of from about 61% to about 70% of the total elution.

The free acid of the condensation product was chromatographed by size exclusion chromatography through a column containing pore sizes which can selectively separate molecular volumes according to size. The solvent chosen was one which minimizes solute-packing interaction and solute-solute interaction. This gave a true molecular volume profile when the eluents were displayed on a detector-strip chart recorder display. Comparison with the sodium salt of the condensation product in U.S. Pat. No. 3,954,491—Adrian et al, issued May 4, 1976 was identical for the anionic materials. That is, the anionic materials had the same profile as the sodium salt on the condensation product having lowest elution volumes of from about 61 to about 70% of the total elution volumes and equivalent elution volumes of from about 61 to about 70% of the total elution volumes. The teachings in the above mentioned patent relating to chromatography are incorporated by reference herein. This method was described by Dr. Harold Edelstein in a paper entitled, "Aqueous Gel Permeation Chromatograph of Some Naphthalene Sulfonic Acid Formaldehyde Condensates" which was presented at the Mini Symposium of the North Jersey Chromatograph Group Subsection of the A.C.S. on Mar. 6, 1978 at Hoffman La Roche Auditorium, Clifton, N. J.

The free acid of the condensation product of naphthalenesulfonic acid and formaldehyde may be added to a slurry of the cementitious composition or to water used in preparation of the composition. In general, the free acid may be added to the cementitious composition before or after the water addition at any point prior to final hardening of the cementitious composition.

The cements used in the preparation of cementitious composition include Type I, II and III cements. Properties of these cements are well known and are described in the Portland Cement Association Engineering Bulletin entitled, "Design and Control of Concrete Mixtures", Eleventh Edition, July 1968, and Kirk-Othmer Encyclopedia of Chemical Technology", Third Edition (Interscience Publishers, N.Y., N.Y. 1979), Volume 5, pages 163-193. Teachings as to the properties of these cements are disclosed in these publications and are incorporated by reference herein.

These cement may be used to prepare mortars containing 100 parts by weight of cement, from about 200 to about 400 parts by weight of sand, from about 38 to about 50 parts by weight of water and an effective amount of the free acid of the condensation product of naphthalenesulfonic acid and formaldehyde to improve the compressive strength of hardened mortar.

Further, these cements may be used to prepare concrete mixes containing 100 parts by weight of cement, from about 140 to about 260 parts by weight of sand, from about 100 to about 200 parts by weight of gravel, from about 35 to about 60 parts by weight of water and an effective amount of the free acid of the condensation product sufficient to improve compressive strength of the hardened concrete. The preferred concrete mixes contain 100 parts by weight of cement, from about 160 to about 230 parts by weight of sand, from about 140 to about 180 parts by weight of gravel, from about 38 to about 50 parts by weight of water and an effective amount of the free acid of the condensation product sufficient to improve compressive strength of the hardened concrete. Concentration of the free acid of the condensation product in the concrete mixes may vary from about 0.05 to about 3%, preferably from about 0.3 to about 1% (by weight of cement) to obtain hardened concrete having improved compressive strength. After preparation, these concrete mixes are then allowed to cure to obtain hardened concretes having improved compressive strengths.

Likewise, these cements as well as oil well cements may be used to prepare grouts and slurries by using an effective amount of the free acid of the condensation product of naphthalenesulfonic acid and formaldehyde to improve compressive strength and to reduce water content.

For a fuller understanding of the nature and objects of this invention, reference may be made to the following examples. These examples are given merely to illustrate the invention and are not to be construed in a limiting sense. All quantities, proportions and percentages are by weight and all references to temperature are °C. unless otherwise indicated.

EXAMPLE I

This example demonstrates evaluation of the free acid of the condensation product of naphthalenesulfonic acid and formaldehyde versus the sodium salt of the condensation product of naphthalenesulfonic acid and formaldehyde at 0.5% by weight of cement in a mortar which was a cement/sand mixture. The anionic materials in the free acid and the sodium salt had an equivalent elution volume by size exclusion chromatography of from about 61% to about 70% of the total elution volume. Proportions of cement, sand and water used in the mixture were 400 pounds of cement, 1200 pounds of sand and 164.5 pounds of water.

Slump was measured according to ASTM standard C143-74. Air content of the fresh concrete was periodically checked by the pressure method (ASTM standard C231-75); however, for convenience, the Chaser air indicator was used more frequently. Specimens used for compressive strength testing were 3×6 in (75×150 mm) cylinders, consolidated by rodding and cured at 70°-75° F. and at 100% relative humidity. Data were collected at 7 days based on the average of values obtained from three cylinders following ASTM standards C39-72. In evaluation of the additives, water in the mixture was reduced to 164.5 pounds for the free acid and to 175 pounds for the sodium salt to achieve workable mortars. Results of these evaluations are as follows:

| Additive | Slump | Compressive Strength 7-Day (psi) | % Water Reduction |
|---|---|---|---|
| free acid | 1¾" | 3,628 | 18.3 |
| sodium salt | 1¾" | 3,226 | 13.2 |

EXAMPLE II

This example demonstrates the evaluation of the free acid and the sodium salt of the condensation product described in Example I in a concrete mix at 0.5% by weight based on weight of cement in the concrete mix and a control concrete mix not having the free acid or the sodium salt as an additive.

Table I entitled, "Standard Mix Proportion Non-Air Entrained Concrete" shows the standard mix proportions used in the concrete mixes. This table is from the Portland Cement Association Engineering Bulletin entitled, "Design and Control of Concrete Mixtures", Eleventh Edition, July 1968. The standard mix proportions given in Table I were used as the control giving a reasonable workability for the tests. In the evaluation of the additives, water in the standard mix was reduced 20% to achieve a workable concrete mix. The cement used was Type I (Portland). Sand and ⅜ in (10 mm) gravel meeting ASTM standard C33-74a were used. Except for a minor modification, the concrete batching procedure using a 2½ cu. ft. (0.07 m³) tilting drum mixer followed ASTM standard C192-69. This variation, which resulted in better reproducibility in the properties of wet concrete, involved adding the free acid or the sodium salt of the condensation product with the last volume of water than initially with the gravel.

TABLE I

| Standard Mix Proportion Non-Air Entrained Concrete | | |
|---|---|---|
| Water/Cement Ratio | = 0.5 | |
| Coarse Aggregate | = ⅜ in. (10 mm) | |
| Fine Aggregate | = Fineness Modulus 2.9 | |
| | Weight | |
| Component | lb | kg |
| Cement | 770 | 349.3 |
| Water | 385 | 174.6 |
| Sand | 1510 | 663.9 |
| Gravel | 1150 | 521.6 |

Slump, compressive strength and water reduction were measured using ASTM standard methods described in Example I to obtain the results shown in Table II.

TABLE II

| Slump and Compressive Strength Evaluations at 16% Water Reduction | | | |
|---|---|---|---|
| | Free Acid | Sodium Salt | Control |
| Slump Test (in.) | 6.0 | 6.0 | 6.0 |
| Compressive Strength (psi) after | | | |
| 1 day | 3655 | 3345 | 2345 |
| 7 days | 5250 | 4119 | 3476 |
| % Increase over Control | 51 | 18 | — |
| % Increase/or Decrease over Sodium Salt | 27 | — | −16 |
| Water/Cement Ratio | 0.42 | 0.42 | 0.50 |

While the invention has been described with reference to certain specific embodiments thereof, it is understood that it is not to be so limited since alterations and changes may be made therein which are within the full and intended scope of the appended claims.

What is claimed is:

1. A hardened cementitious composition having improved compressive strength and reduced water content prepared from a cementitious composition and an effective amount of a free acid of a condensation product of naphthalenesulfonic acid and formaldehyde wherein anionic materials in the free acid have equivalent elution volume by size exclusion chromatography of from about 61% to about 70% of the total elution.

2. The hardened cementitious composition of claim 1 wherein the composition is prepared from a concrete mix containing 100 parts by weight of cement, from about 140 to about 260 parts by weight of sand, from about 100 to about 200 parts by weight of gravel and from about 35 to about 60 parts by weight of water.

3. The hardened cementitious composition of claim 1 wherein the composition is prepared from a mortar mix containing 100 parts by weight of cement, from about 200 to about 400 parts by weight of sand and from about 38 to about 50 parts by weight of water.

4. The hardened cementitious composition of claim 2 wherein from about 0.1 to about 5.0% by weight of the free acid based on weight of cement is present.

5. The hardened cementitious composition of claim 3 wherein from about 0.05 to about 3.0% by weight of the free acid based on weight of cement is present.

6. A process for production of a hardened cementitious composition of claim 1 comprising adding to a cementitious composition an effective amount of a free acid of a condensation product of naphthalenesulfonic acid and formaldehyde wherein anionic materials in the free acid have an equivalent elution volume by size exclusion chromatography of from about 61% to about 70% of the total elution.

7. The process of claim 6 wherein the cementitious composition is a concrete mix containing 100 parts by weight of cement, from about 140 to about 260 parts by weight of sand, from about 100 to about 200 parts by weight of gravel and from about 35 to about 60 parts by weight of water.

8. The process of claim 6 wherein the cementitious composition is a mortar mix containing 100 parts by weight of cement, from about 200 to about 400 parts by weight of sand and from about 38 to about 50 parts by weight of water.

9. The process of claim 7 wherein from about 0.1 to about 5.0% by weight of the free acid based on weight of cement is present.

10. The process of claim 8 wherein from about 0.05 to about 3.0% by weight of the free acid based on weight of cement is present.

* * * * *